UNITED STATES PATENT OFFICE.

VINCENZO MASSIMINO, OF CHARLESTON, WEST VIRGINIA.

WELDING FLUID.

No. 905,729.  Specification of Letters Patent.  Patented Dec. 1, 1908.

Application filed July 29, 1908. Serial No. 446,002.

*To all whom it may concern:*

Be it known that I, VINCENZO MASSIMINO, a citizen of the United States, residing at Charleston, in the county of Kanawha and State of West Virginia, have invented certain new and useful Improvements in Welding Fluids; and I do hereby declare the following to be a full, clear, and exact description of the invention, such as will enable others skilled in the art to which it appertains to make and use the same.

This invention relates to new and useful improvements in welding fluids and the object of the invention is to provide a novel fluid of this character intended more particularly to be employed with the welding of copper.

The fluid consists of a mixture of the juice of *L. sativa* or lettuce or more particularly the common wild form thereof known as *L. canadensis* and crushed dunglison or blue stone.

The proportions of the ingredients used are as follows: lettuce, two pounds and blue-stone one ounce, the lettuce and blue-stone being placed in any suitable form of press and the juice contained in the lettuce and blue-stone squeezed therefrom.

In the process of welding the copper ends to be united are brought to a desired heat and are then dipped in the mixture. The ends are then again heated the required time when they are taken from the fire and welded in the usual way.

I claim:

A welding fluid consisting of a mixture of crushed blue stone and the juice of lettuce.

In testimony whereof I have signed my name to this specification in the presence of two subscribing witnesses.

VINCENZO $\overset{\text{his}}{\times}$ MASSIMINO.
<br>mark

Witnesses:
JAS. DIANA,
EDWARD M. BURDETTE.